United States Patent
Monzo et al.

(10) Patent No.: US 11,485,842 B2
(45) Date of Patent: Nov. 1, 2022

(54) NATURAL FIBERS AND POWDERY POLYPROPYLENE HOMOPOLYMER BASED COMPOSITION

(71) Applicant: FAURECIA INTERIEUR INDUSTRIE, Nanterre (FR)

(72) Inventors: Jean-Michel Monzo, Parmain (FR); Hassane Boudhani, Beauvais (FR); Laurence Dufrancatel, Herblay (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 79 days.

(21) Appl. No.: 16/449,193

(22) Filed: Jun. 21, 2019

(65) Prior Publication Data

US 2019/0390046 A1 Dec. 26, 2019

(30) Foreign Application Priority Data

Jun. 22, 2018 (FR) ..................... 18 55561

(51) Int. Cl.
| | |
|---|---|
| *B29C 48/00* | (2019.01) |
| *B29C 48/285* | (2019.01) |
| *C08L 23/12* | (2006.01) |
| *B29K 23/00* | (2006.01) |
| *B29K 311/10* | (2006.01) |

(52) U.S. Cl.
CPC ............ *C08L 23/12* (2013.01); *B29C 48/001* (2019.02); *B29C 48/288* (2019.02); *B29K 2023/12* (2013.01); *B29K 2311/10* (2013.01); *C08K 2201/004* (2013.01); *C08L 2205/06* (2013.01); *C08L 2205/08* (2013.01); *C08L 2205/16* (2013.01)

(58) Field of Classification Search
CPC ...... C08L 23/12; C08L 1/02; C08K 2201/004
See application file for complete search history.

(56) References Cited

U.S. PATENT DOCUMENTS

| | | | |
|---|---|---|---|
| 2006/0135699 A1* | 6/2006 | Li | C08L 23/142 |
| | | | 525/240 |
| 2009/0118398 A1 | 5/2009 | Nascimento et al. | |
| 2014/0291894 A1 | 10/2014 | Kannengiesser et al. | |
| 2014/0336309 A1* | 11/2014 | Sakata | C08K 7/02 |
| | | | 524/35 |
| 2015/0252179 A1 | 9/2015 | Kwon et al. | |
| 2016/0137824 A1 | 5/2016 | Kohler et al. | |

FOREIGN PATENT DOCUMENTS

| | | | |
|---|---|---|---|
| EP | 2821434 A1 | | 1/2015 |
| JP | 2011231237 A | * | 11/2011 |
| WO | WO0200408 A2 | | 1/2002 |
| WO | WO2006108256 A1 | | 10/2006 |
| WO | WO2012004193 A1 | | 1/2012 |
| WO | WO2012093167 A1 | | 7/2012 |
| WO | WO2015039635 A1 | | 3/2015 |

OTHER PUBLICATIONS

French Search Report corresponding to French application No. FR 1855561, dated Feb. 27, 2019, 2 pages.
K. Luker, "Innovations in Small Extruders That Promote Feeding and Pressure Stability" Randcastle Extrusion Systems, Inc., 17 pages.

* cited by examiner

*Primary Examiner* — Irina S Zemel
*Assistant Examiner* — Jeffrey S Lenihan
(74) *Attorney, Agent, or Firm* — Reising Ethington P.C.

(57) ABSTRACT

A composition that includes: (a) from 65 to 85% by weight of polypropylene homopolymer in powder form, the average particle size of which is micrometric, (b) from 14 to 30% by weight, preferably 14 to 25% by weight, of natural fibers less than or equal to 2 mm in length, and (c) from 1 to 3% by weight of compatibilizer, its uses for the preparation of a composite material by extrusion, wherein this composite material is useful for preparing a part by injection, in particular a vehicle part whose rigidity is improved.

8 Claims, No Drawings

NATURAL FIBERS AND POWDERY POLYPROPYLENE HOMOPOLYMER BASED COMPOSITION

TECHNICAL FIELD

The present invention relates to a composition based on natural fibers, in particular for the manufacture of parts in the automotive field.

BACKGROUND

Various composite materials that are useful for the preparation of automotive interior parts are commercially available or described in the literature. For example, the application WO 2012/093167 describes a composite material comprising:
- (a) 28 to 95% by weight of a matrix-forming polypropylene-polyethylene copolymer;
- (b) 0 to 10% by weight of a flow agent, in particular a polyolefin such as polyethylene or polypropylene homopolymer;
- (c) 1 to 20% by weight of an impact modifier;
- (d) 1 to 20% by weight of a compatibilizer; and
- (e) 3 to 70% by weight of natural fibers, and its uses in the preparation of interior parts of vehicles.

The parts obtained from a composite material based on natural fibers are advantageously lighter than those prepared from a composite material based on glass fibers. However, the parts obtained from a composite material based on natural fibers are less rigid than those obtained from a composite material comprising glass fibers in place of natural fibers (with the same fiber content).

Composite materials based on natural fibers making it possible to prepare parts having improved rigidity are therefore sought.

SUMMARY AND DETAILED DESCRIPTION

For this purpose, according to a first object, the invention relates to a composition useful for the preparation of such a composite material. The composition comprises:
- (a) from 65 to 85% by weight of polypropylene homopolymer in powder form, the average particle size of which is micrometric;
- (b) from 14 to 30% by weight, preferably from 14 to 25% by weight, of natural fibers of length less than or equal to 2 mm,
- (c) from 1 to 3% by weight of compatibilizer.

The composition comprises from 65 to 85% by weight polypropylene homopolymer in powder form, the average particle size of which is micrometric. As used herein, "micrometric" means that the average particle size measured by image scanning electron microscopy (SEM) or laser diffraction analysis, preferably laser diffraction, is from 1 to 1000 μm, in particular from 300 to 1000 μm, preferably from 300 to 800 μm. The average size of the particles corresponds to their average diameter.

The polypropylene homopolymer preferably has a melt index at 230° C. under a load of 2.16 kg greater than 30 g/10 min, in particular from 30 to 150 g/10 min, preferably from 40 to 125 g/10 min.

In the application, melt indexes (Melt Flow Indexes (MFI)) are as measured according to ISO 1133-2 (2011).

The composition comprises from 14 to 30% by weight, in particular from 14 to 25% by weight, preferably from 17 to 25% by weight, of natural fibers of length less than or equal to 2 mm, for example of length from 300 μm to 2 mm. Fibers of greater length are generally more difficult to incorporate into the composition, and thus into the composite material. Fiber proportions of less than 14% generally result in a composition which, when extruded, gives a composite material of insufficient rigidity.

The presence of natural fibers makes it possible, in particular, to increase the thermal resistance of the composition.

Even in the presence of these natural fibers, the composition makes it possible to inject large parts such as dashboard inserts. However, optimum injection behavior is observed when it contains less than 30% by weight, in particular less than 25% by weight, of natural fibers.

The term "natural fibers" refers to fibrous materials derived from materials of plant or animal origin. The natural fibers are preferably derived from:
- seeds or fruit of a plant, such as cotton, kapok, milkweed and/or coconut,
- the stem of the plant, such as flax, hemp, jute, ramie and/or kenaf,
- leaves of the plant such as sisal, Manila hemp, abaca, henequen, raffia and/or agave,
- the trunk of the plant, such as wood (softwood or hardwood) and/or banana,
- herbaceous plants such as switchgrass, *miscanthus*, bamboo, sorghum, esparto and/or sabei *communis*,
- the stem of agricultural waste such as rice, wheat and/or corn,
- hair, secretion or feathers of animals, such as wool, alpaca, mohair, cashmere, angora, goose feathers, silk, Tussah or wild silk and/or spider silk, and mixtures thereof. Natural fibers from the stem, such as flax, hemp, jute, ramie and/or kenaf, are particularly preferred. Generally, wood powder or wood flour is not considered as belonging to natural fibers.

The fibers generally have a water content of less than 5% by weight, preferably less than 2% by weight. Such contents may be obtained by drying them.

The composition comprises from 1 to 3% by weight of a compatibilizing agent.

The term "compatibilizing agent" refers to compounds having two ends of different chemical structure respectively having a particular affinity for two components of a heterogeneous material, thereby making it possible to improve the compatibility between these two components. The compatibilizing agent ensures good affinity between the fibers and the other components of the composition and thus makes it possible to obtain a homogeneous mixture.

As a compatibilizing agent may be mentioned, in particular, a compound chosen from polyolefins grafted with polar groups. As polyolefins, polypropylene or polypropylene (co)polymers may be mentioned.

Particularly preferred are polyolefins grafted with a carboxylic acid (such as maleic acid), one of its esters or anhydrides (such as maleic anhydride), with an epoxy (such as an oxirane, typically a polyolefin obtained using glycidyl methacrylate as comonomer) or a silane.

The compatibilizing agent may also be in the form of a powder whose average particle size measured by scanning electron microscopy is micrometric, in particular between 1 and 1000 μm, preferably from 300 to 1000 μm, for example from 300 to 800 μm.

The composition may further comprise from 0 to 15% by weight, in particular from 0.1 to 15% by weight, preferably from 3 to 11% by weight, of an impact modifier.

The term "impact modifier" refers to agents added to a material in order to improve the properties of impact resistance. These modifiers are polymers or molecules that form multiphase systems with the matrix or that react chemically with the matrix, thus improving its resilience.

The impact modifier is preferably an elastomeric compound, especially chosen from the group consisting of the ethylene-propylene-diene monomer (EPDM), the ethylene-propylene monomer (EPM), the ethylene-propylene rubber (EPR) and the elastomeric polyolefins (EPO), copolymers and terpolymers based on ethylene, propylene, butene and octene, nitrile-butadiene rubber (NBR), isobutylene (IB), chlorinated rubber, poly(styrene-butadiene-styrene) (SBS), styrene-ethylene-butene-styrene copolymer (SEBS), isobutylene-isoprene rubber (IIR), styrene-isoprene-styrene copolymer (SIS), chlorinated polyethylene (CM), polymers of isoprene, copolymers of ethylene and butylene, their mixtures and derivatives, in particular grafted with maleic acid, and/or maleic anhydride.

The composition may further comprise a polypropylene homopolymer of high melt index, and different from the polypropylene homopolymer described above. Thus, the composition may comprise less than 20% by weight, in particular from 0.1 to 15% by weight, of a polypropylene homopolymer having a melt index at 230° C. under a load of 2.16 kg greater than 400 g/10 min, in particular from 500 to 2000 g/10 min, preferably from 500 to 1500 g/10 min. This polypropylene homopolymer is preferably obtained by metallocene catalysis. In fact, it is found that metallocene catalysis leads to polyolefins whose melting temperature is much lower than a polyolefin obtained by Ziegler Natta catalysis, thus leading to a much greater fluidity of the polymer. In addition, metallocene catalysis induces a much narrower molecular weight distribution and thus a lower content of molecules of low weight thereby reducing the content of potentially injectable compounds. It is therefore not necessary, as in the case of polyolefins obtained by Ziegler-Natta catalysis, to use chemical means, such as the breaking of chains by acid attack (e.g. maleic anhydrides) to achieve high fluidities. The choice of such homopolymers of high fluidity indices therefore contributes to making possible the injectability of large parts such as automotive dashboard body inserts.

The composition may consist of:
(a) from 65 to 85% by weight, in particular from 65 to 84.8% by weight, of homopolymer polypropylene having a melt index at 230° C. under a load of 2.16 kg greater than 30 g/10 min, in particular from 30 to 150 g/10 min, preferably from 40 to 125 g/10 min, the polypropylene homopolymer being in the form of a powder whose average particle size is micrometric,
(b) from 14 to 30% by weight, preferably from 14 to 25% by weight, of natural fibers of length less than or equal to 2 mm,
(c) from 1 to 3% by weight of compatibilizer,
(d) from 0 to 15% by weight, in particular from 0.1 to 15% by weight, of an impact modifier
(e) from 0 to 20% by weight, in particular from 0.1 to 15% by weight, of a polypropylene homopolymer having a melt index at 230° C. under a load of 2.16 kg greater than 400 g/10 min, in particular from 500 to 2000 g/10 min, preferably from 500 to 1500 g/10 min.

According to a second object, the invention relates to a method for preparing a composite material comprising extruding a composition as defined above to obtain a composite material, optionally followed by granulation to obtain the composite material in pellet form.

Generally, the polypropylene homopolymer forms the matrix of the composite material.

The extrusion is preferably carried out in a screw extruder, such as a twin-screw, single-screw, planetary extruder, and preferably a co-kneader type single-screw extruder which limits shearing and is used at low temperature (<200° C.), thus advantageously avoiding the degradation of natural fibers and ensuring very good dispersion of the fibers in the homopolymer matrix.

According to a third object, the invention relates to the composite material obtainable by this method.

According to a fourth object, the invention relates to a method for preparing a part by injection of the composite material defined above. This part generally has at least one dimension which measures more than 50 cm, in particular more than 100 cm, preferably more than 150 cm. Typically, the pellets of composite material are brought into contact with a heated and temperature-controlled plasticizing screw. The pellets are softened under the combined action of the screw and the temperature to reach a viscous state at the front of the screw, and constituting the supply of material ready to be injected. The material present at the front of the plasticizing screw is then injected under high pressure into a mold (or cavity) having the desired shape for the part. The part is then cooled for a few seconds and then ejected.

The method for preparing the part may comprise the preliminary steps for preparing the composite material, and thus may comprise the following steps:
extrusion of a composition as defined above to obtain a composite material, then
optional granulation to obtain the composite material in the form of pellets, then
injection to obtain the part.

According to a fifth object, the invention relates to the use of the composite material defined above for preparing a part by injection.

According to a sixth object, the invention relates to the part obtainable by this method. This part is preferably a vehicle part, preferably a car part, including an automotive interior part, for example an interior trim part, such as a dashboard, a dashboard insert, a center console, or a door panel.

The parts may have large dimensions, wherein at least one of the dimensions is greater than 50 cm, preferably more than 100 cm, sometimes more than 150 cm. One may mention a dashboard insert, which typically has a dimension of about 1600 cm long.

This part has improved rigidity compared to a part prepared from composite materials based on conventional natural fibers, in particular that described in the application WO 2012/093167. The rigidity may even achieve that obtained for parts obtained from composite materials based on glass fibers.

Without wishing to be bound by a particular theory, the inventors assume that the use of a powdery polypropylene homopolymer makes it possible to improve the dispersibility of the natural fibers in the polypropylene homopolymer matrix, and thus the compatibility between the polypropylene homopolymer matrix and the natural fibers, which would explain the improvement of the rigidity of the part so obtained.

As the part is prepared from natural fibers, it is light, usually 6.5 to 7% lighter than a part made from an identical composite material except the replacement of the natural fibers by glass fibers.

The part has mechanical properties, including rigidity that are improved compared to a part prepared from a composite material based on glass fibers. Thus, it is possible to prepare a reduced-size part, typically of reduced thickness, compared to a part prepared from a composite material based on glass fibers while maintaining the mechanical properties, in particular of rigidity, relative to a part prepared from a composite material based on glass fibers.

On this basis, by combining the weight reduction associated with the use of lighter natural fibers and the weight reduction related to the reduction of the thickness of the part, the part according to the invention is typically 10 to 25% lighter than a part having identical mechanical properties (and therefore thicker) and prepared from an identical composite material except the replacement of the natural fibers by glass fibers.

The average tensile modulus (longitudinal and/or transversal) according to ISO 527 of 2012 of a part prepared from a composite material (and therefore a composition) generally increases with the proportion of natural fibers. The tensile modulus of a part prepared from a composite material (and therefore a composition) comprising 20% by weight of natural fibers is generally less than 3000 MPa. The tensile modulus of a part prepared from the composite material according to the invention (and therefore of the composition according to the invention) comprising 20% by weight of natural fibers (same fiber content) is advantageously greater than 3800 MPa. The average tensile modulus (longitudinal and/or transverse) is therefore higher than that of a part prepared from a composite material prepared from a composition having the same composition, except that the polypropylene homopolymer in the form of powder is replaced by polypropylene homopolymer in the form of pellets.

According to a seventh object, the invention relates to a method for improving the rigidity (and therefore the average tensile modulus (longitudinal and/or transversal) according to ISO 527 of 2012) of a part comprising the steps of:
    extrusion of a composition comprising:
        (a) from 65 to 85% by weight of polypropylene homopolymer,
        (b) from 14 to 30% by weight, preferably 14 to 25% by weight, of natural fibers less than or equal to 2 mm in length, and
        (c) from 1 to 3% by weight of compatibilizer, to obtain a composite material and then
    optional granulation to obtain the composite material in the form of pellets, then
    injection to obtain the part,
in which the polypropylene homopolymer used in the extrusion is in the form of a powder whose average particle size measured by scanning electron microscopy is micrometric, in particular between 1 and 1000 µm, preferably from 300 to 1000 µm, by example of 300 to 800 µm.

EXAMPLE

In a twin-screw extruder were introduced through a first hopper: 70 kg of powdery polypropylene homopolymer (particle size between 300 and 800 µm), such as Icorene N4450 from A. Schulman, 2 kg of compatibilizer, Orevac CA100 from Arkema, and 20 kg of ret hemp fiber of lengths less than 2 mm provided by APM TF, half of which is introduced by means of a second hopper located downstream, 5 kg of an ethylene-octene copolymer impact modifier, Exact 8201 supplied by ExxonMobil Chemical, and 3 kg of a metallocene homopolymer with a MFI of 800 g/10 min Borflow HL508FB supplied by *Borealis*. The components and their proportions are shown in the table below:

TABLE 1

Composition of the composition used to prepare the composite material

| Component | Proportion [% by weight] |
| --- | --- |
| Polypropylene homopolymer powder | 70 |
| Compatibilizer | 2 |
| Hemp fibers | 20 |
| Impact modifier | 5 |
| Homopolymer of high MFI | 3 |

The mixture was extrusion-compounded under the following conditions:
    Temperature 180° C.
    Pressure: 5 to 30 bar
The composite material was obtained in the form of pellets that could be used for the production of parts by injection.

Injectability was measured by the spiral flow test, which is a measure of the viscosity of the resins in a spiral-shaped mold (e.g. an AIM Insert Spiral Flow "Axxicon" mold (3 mm)) having a specified section thickness and a circular flow path length (sample sizes: 1150×5×3 mm). The cross-section of the mold is constant. Composite materials are evaluated under typical injection molding conditions. The length of the flow in the mold is a function of the viscosity of the composite material, the injection pressure, the degree of filling, and the injection temperature. To compare the injectability of two composite materials, therefore, comparative tests should be performed at the same injection pressures, fill rates, and injection temperatures. The injection conditions used determine the final length of the spiral formed by the composite material injected into the mold. There is no holding phase because there is no end in the mold. As the cross-section of the mold is constant, the flow rate is constant. The composite material is melt-injected at a maximum pressure value, which is determined by the fact that the material must reach all the sensors in the mold. The test was carried out under the following conditions: maximum injection temperature (end of screw): 185° C., injection rate: 30 cm³/s, injection pressure: 115 bar.

This composite material makes it possible to obtain a 34% more rigid part than a composite material obtained from the same composition, except wherein the powdery PP homopolymer was replaced by a granulated PP homopolymer (HJ325MO *Borealis*). The table below lists the key properties of composite materials prepared.

TABLE 2

Mechanical, thermal, and rheological properties profile

| Properties | Unit | Form of the homopolymer PP in the composition | | Improvement due to the replacement of the pellets by powder |
| --- | --- | --- | --- | --- |
| | | Pellets (comparative) | powder (invention) | |
| Modulus of elasticity at 23° C. (ISO 527) | MPa | 2950 | 3950 | 34% |
| Load deflection temperature (HDT B) (0.45 MPa) (ISO 75) | ° C. | 137 | 145 | — |

TABLE 2-continued

Mechanical, thermal, and rheological properties profile

| Properties | Unit | Form of the homopolymer PP in the composition | | Improvement due to the replacement of the pellets by powder |
|---|---|---|---|---|
| | | Pellets (comparative) | powder (invention) | |
| Spiral flow length | Cm | 65 | 80 | 23% |

The invention claimed is:

1. A composition comprising:
 (a) from 70 to 85% by weight of polypropylene homopolymer having a melt index greater than 30 g/10 min at 230° C. under a load of 2.16 kg;
 (b) from 17 to 30% by weight of natural fibers less than or equal to 2 mm in length, the natural fibers being bamboo, flax, hemp, lute, ramie, or kenaf fibers; and
 (c) from 1 to 3% by weight of compatibilizer, the compatibilizer being a polypropylene grafted with: a carboxylic acid, an ester of a carboxylic acid, or an anhydride of a carboxylic acid,
 wherein the polypropylene homopolymer is in the form of a powder whose average particle size measured by scanning electron microscopy is in a range from 300 µm to 800 µm.

2. The composition according to claim 1, comprising from 3% to 11% by weight of an impact modifier selected from copolymers and terpolymers based on ethylene, propylene, butene and octene.

3. The composition according to claim 1, wherein the natural fibers are hemp fibers.

4. The composition according to claim 1, wherein the compatibilizer comprises a polypropylene grafted with an anhydride of a carboxylic acid.

5. The composition according to claim 1, wherein the compatibilizer comprises a polypropylene grafted with maleic anhydride.

6. A method for preparing a composite material comprising extruding a composition according to claim 1 to obtain the composite material, optionally followed by granulation to obtain the composite material in the form of pellets.

7. A method for improving the rigidity of a part comprising the steps of:
 extrusion of a composition comprising:
 (a) from 70 to 85% by weight of polypropylene homopolymer having a melt index greater than 30 g/10 min at 230° C. under a load of 2.16 kg, the polypropylene homopolymer being in the form of a powder having an average particle size that is in a range from 300 µm to 800 µm as measured by scanning electron microscopy;
 (b) from 17 to 30% by weight of natural fibers less than or equal to 2 mm in length, the natural fibers being bamboo, flax, hemp, lute, ramie, or kenaf fibers; and
 (c) from 1 to 3% by weight of compatibilizer comprising a polypropylene grafted with: a carboxylic acid, an ester of a carboxylic acid, or an anhydride of a carboxylic acid,
 to obtain a composite material, then
 optional granulation to obtain the composite material in the form of pellets, then
 injection of the composite material to obtain the part,
 wherein the obtained part is more rigid than a part obtained via injection of a second composite material obtained by extrusion of the same composition, except that the polypropylene homopolymer used in the extrusion is not powdery.

8. A composition consisting essentially of:
 (a) from 70 to 85% by weight of homopolymer polypropylene having a melt index from 30 to 150 g/10 min at 230° C. under a load of 2.16 kg, the polypropylene homopolymer being in the form of a powder whose average particle size is micrometric in a range from 300 µm to 800 µm,
 (b) from 17 to 30% by weight of natural fibers of length less than or equal to 2 mm,
 (c) from 1 to 3% by weight of compatibilizer, the compatibilizer being a polypropylene grafted with: carboxylic acid, an ester of a carboxylic acid, or an anhydride of a carboxylic acid,
 (d) from 0 to 11% by weight of an impact modifier chosen from copolymers and terpolymers based on ethylene, propylene, butene, and octene, and
 (e) from 0 to 20% by weight of a polypropylene homopolymer having a melt index greater than 400 g/10 min at 230° C. under a load of 2.16 kg.

* * * * *